United States Patent [19]

Miller

[11] 4,382,005
[45] May 3, 1983

[54] OIL-SOLUBLE NITROGEN CONTAINING SULFONATED POLYMERS USEFUL AS OIL ADDITIVES

[75] Inventor: Harold N. Miller, Houston, Tex.

[73] Assignee: Exxon Research & Engineering Co., Florham Park, N.J.

[21] Appl. No.: 279,669

[22] Filed: Jul. 1, 1981

Related U.S. Application Data

[63] Continuation of Ser. No. 195,846, Oct. 10, 1980, abandoned.

[51] Int. Cl.$^3$ ............................ C10M 1/40; C10L 1/24
[52] U.S. Cl. ................................. 252/32.7 E; 252/33; 252/51.5 A; 252/391; 44/62; 44/72; 44/76; 260/504 R; 260/513 N
[58] Field of Search ...................... 252/33, 327 E, 391, 252/51.5 A; 44/62, 72, 76; 260/504 R, 513

[56] References Cited

U.S. PATENT DOCUMENTS

| | | | |
|---|---|---|---|
| 2,367,468 | 1/1945 | Mixon et al. | 252/48 |
| 2,677,702 | 5/1954 | Bloch et al. | 260/513 |
| 2,883,340 | 4/1959 | Wasley et al. | 252/33 |
| 3,325,418 | 6/1967 | Stuart | 252/32.7 |
| 3,352,782 | 11/1967 | Brasch | 252/47.5 |
| 3,396,136 | 8/1968 | Dickerson | 260/30.6 |
| 3,679,382 | 7/1972 | Cohrs et al. | 44/7 D |
| 3,836,511 | 9/1974 | O'Farrell et al. | 260/79.3 R |
| 3,931,021 | 1/1976 | Lundberg | 252/32.5 |
| 3,941,834 | 3/1976 | Lee | 260/504 R |
| 3,950,401 | 4/1976 | Petrille et al. | 260/504 R |
| 4,120,804 | 10/1978 | Smith et al. | 252/51.5 A |

FOREIGN PATENT DOCUMENTS

| | | |
|---|---|---|
| 2348 | 6/1979 | European Pat. Off. |
| 1246545 | 2/1969 | United Kingdom |
| 1239082 | 7/1971 | United Kingdom |

*Primary Examiner*—Jacqueline V. Howard
*Attorney, Agent, or Firm*—Frank T. Johmann

[57] ABSTRACT

This invention relates to oil soluble, nitrogen containing sulfonated polymers useful as additives for lubricating oil and fuel oil, which are effective as dispersants and viscosity modifiers. The polymeric dispersant additives are ionic polymers which comprise a backbone substantially soluble in the fuel or lubricant, and pendant ionic groups which are sulfonic acid groups which may be nuetralized with an ammonium cation or an amine. Polymeric dispersant additives of this type may be made which are particularly useful in crankcase lubricating oils for imparting viscosity improvement, varnish inhibition, oxidation inhibition and detergency to the lubricant. These additives may also impart rust preventive properties to the oil or fuel, and as V.I. improvers they can be formed to have particularly good low temperature viscosity effects in lubricating oil.

47 Claims, No Drawings

OIL-SOLUBLE NITROGEN CONTAINING SULFONATED POLYMERS USEFUL AS OIL ADDITIVES

This is a continuation of application Ser. No. 195,846, filed Oct. 10, 1980.

BACKGROUND OF THE INVENTION

1. Field of the Invention

This invention relates to oil-soluble polymeric additives for fuel and lubricant compositions, including concentrates, containing said additives and methods for their manufacture and use, wherein the polymeric additives are ionic polymers made by sulfonating an aliphatic hydrocarbon polyolefin polymer, which is neutralized with ammonia, ammonium salts or amine. The polymeric additives are capable of imparting viscosity improvement, dispersancy, varnish inhibition, anti-rust and detergency.

Various polymers containing neutralized sulfonic acid groups are known in the additive art as follows:

U.S. Pat. No. 2,367,468 teaches metal, ammonia and amine salts of 500–3,000 molecular weight olefin copolymer reacted with chlorosulfonic acid to form a lubricant additive.

U.S. Pat. No. 2,677,702 forms a water-soluble sulfonated polymer wherein an olefin and a conjugated diene such as butadiene and isobutylene, are copolymerized and sulfonated to form polymers which can then be neutralized with metals, amines or alkanol amines, said polymers having molecular weights of about 1,000–6,000 and being useful in aqueous solutions and as emulsifiers.

U.S. Pat. No. 2,883,340 teaches V.I.-detergent additives for lubricating oil by sulfonating with $SO_3$ or chlorosulfonic acid, a polymer of low molecular weight olefin, e.g. $C_3$ to $C_6$ olefins such as isobutylene, or copolymers such as butadiene-isoprene, of 10,000 to 50,000 molecular weight and then forming a metal salt.

U.S. Pat. No. 3,325,418 teaches high molecular weight polychlorosulfonated polymers which can be reacted with amines and are useful as V.I. improvers and as detergents in lubricating oils.

U.S. Pat. No. 3,352,782 reacts polymers having about 30–250 carbons and about 400–3,000 Staudinger molecular weight, which may have single or multiple unsaturations, such as polyisobutylene, with a chlorosulfonic acid.

U.S. Pat. No. 3,396,136 forms metal salts of polymeric sulfonic acid which polymers are prepared by polymerizing various monomers with an alkenyl aromatic sulfonic acid monomer, or by directly sulfonating polymers containing sulfonable aromatic groups and forming metal salts, to form a V.I. improver for lubricating oil.

U.S. Pat. No. 3,679,382 teaches a hydrocarbon fuel thickend with a polymeric material such as styrene copolymerized with an acrylate such as a sulphonic methacrylate.

U.S. Pat. No. 3,836,511 teaches a process for sulfonation of high molecular weight rubbers such as copolymers of ethylene, propylene and diene monomers, with an acyl sulfate prepared by mixing an anhydric monobasic acid such as acetic anhydride with sulfuric acid. Column 13 teaches that these materials may be reacted with any amine. Example 10 10 indicates that an advantage of the acyl sulfate is that it can be used without degradation of the polymer. However, there is no teaching of use in lubricating oil of the products thereby formed.

U.S. Pat. No. 3,931,021 teaches high molecular weight polymers, such as those of ethylene and other olefins, which are sulfonated and can be neutralized with a metal compound, following which a cosolvent is used. The cosolvent may be an alcohol or an amine in relatively large amounts, e.g. 10–600 moles per molecular portion of the sulfonic acid moiety. The resulting material is taught as useful in lubricating oil as a V.I. improver.

U.S. Pat. No. 3,941,834 teaches polymers of 300–200,000 molecular weight of $C_2$-$C_6$ unsaturated hydrocarbons which are reacted with chlorosulfonic acid and then reacted to form metal salts or amine compounds, with the amine compounds apparently reacting through the chlorine, which materials are useful multifunctional additives serving as V.I. improvers and detergents in lubricating oil.

U.S. Pat. No. 3,950,401 teaches sulfonation of low molecular weight polymers of 250–500 molecular weight prepared from propene or butene as lubricating oil anti-rust additives.

U.S. Pat. No. 4,086,171 teaches a block copolymer of a sulfonated monoalkenyl arene such as styrene, with an unsaturated olefin such as butadiene, said polymer being selectively hydrogenated and then sulfonated, and which can be reacted with ammonia or amines to form a V.I. detergent additive for lubricating oil.

U.K. Pat. No. 1,246,545 teaches dehydrohalogenating a chlorinated olefin polymer such as polyisobutylene of about 20 to 150 carbons, and then sulfonating and neutralizing with a metal base or amine to form a detergent additive for lubricating oil.

SUMMARY OF THE INVENTION

In contrast to the above patents, the present invention is directed to polymers which are oil soluble and not water soluble, which are sulfonated but without requiring the presence of chlorine, which are aliphatic and do not require aromatic groups in the polymer, which are reacted with ammonia, ammonium salts, or amines to form a multifunctional V.I. improver-dispersancy additive and do not require the use of a cosolvent, and which can provide a plurality of sulfonate groups on the polymer.

The Neutralized Sulfonated Polymer

Useful additives include oil-soluble nitrogen containing sulfonated polymers of $C_2$ to $C_{50}$, preferably $C_2$ to $C_{18}$ aliphatic olefins, said additives after sulfonation and neutralization having number average molecular weights (Mn) of from about 5000 to 1,000,000; e.g. 10,000 to 500,000, e.g. 20,000 to 200,000 as determined by vapor phase osmometry, gel permeation chromatography or more preferably by membrane osmometry, and containing about 0.005 to 2.5, preferably 0.025 to 1.75 wt. % nitrogen, and about 0.03 to 1.92, preferably 0.06 to 1.00 wt. % sulfur. In terms of milliequivalents (meq) the nitrogen contents will be about 0.35 to 180, preferably 1.8 to 125 millimoles per 100 grams of sulfonated polymer. The aforesaid sulfur levels are equivalent to about 1 to 60, preferably about 2 to 31 millimoles of sulfonate ($SO_3$) groups per 100 grams of sulfonated polymer.

The Polymer

Sulfonatable, e.g. having at least one ethylenic unsaturation, hydrocarbon polymers of $C_2$ to $C_{50}$, e.g. $C_2$ to $C_{18}$ aliphatic olefins can be used. Particularly preferred for sulfonation are aliphatic terpolymers, of ethylene and higher $C_3$ to $C_{18}$ α-olefins, and a $C_5$ to $C_{14}$ diolefin. These terpolymers will generally comprise about 30 to 84.5 mole % ethylene; about 15 to 69.5 mole % of one or more of higher $C_3$ to $C_{18}$ olefin, and about 0.5 to 20 mole % of one or more of the diolefin. Preferred are polymers of 40 to 70 mole % ethylene, 20 to 58 mole % of the higher olefin and 2 to 10 mole % of diolefin. On a weight basis usually at least 2 wt. % of the terpolymer will be the diolefin and many commercially available polymers will contain about 3 to 5 wt. % diene. Mixtures of monoolefins and/or mixtures of diolefins can be used.

Examples of the above-noted higher $C_3$-$C_{18}$ alpha monoolefins include propylene, 1-butene, 1-pentene, 1-hexene, 1-heptene, 1-decene, 1-dodecene, 1-heptadecene, 4-methyl-1-pentene, etc. Preferred are the $C_3$-$C_8$ monoolefins, particularly propylene.

Representative nonlimiting examples of the nonconjugated diolefins include:

A. Straight chain acyclic dienes such as: 1,4-hexadiene, 1,5-heptadiene, 1,6-octadiene.

B. Branched chain acyclic dienes such as: 5-methyl-1,4-hexadiene; 3,7-dimethyl 1,6-octadiene; 3,7-dimethyl 1,7-octadiene; and the mixed isomers of dihydromyrcene and dihydroocimene.

C. Single ring alicyclic dienes such as: 1,4-cyclohexadiene; 1,5-cyclooctadiene; 1,5-cyclododecadiene; 4-vinyl-cyclohhexene; 1-allyl-4-isopropylidene cyclohexane; 3-allyl-cyclopentene; 4-allyl-cyclohexene and 1-isopropenyl-4(4-butenyl) cyclohexane.

D. Multi-single ring alicyclic dienes such as: 4,4'-dicyclopentenyl and 4,4'-dicyclohexenyl dienes.

E. Multi-ring alicyclic fused and bridged ring dienes such as: tetrahydroindene; methyl tetrahydroindene; dicyclopentadiene; bicyclo(2.2.1)hepta 2.5-diene; alkenyl, alkylidene, cycloalkenyl and cycloalkylidene norbornenes such as: 5-methylene-2-norbornene; 5-ethylidene-2-norborene; 5-methylene-6-methyl-2-norbornene; 5-methylene-6,6-dimethyl-2-norbornene; 5-propenyl-2-norbornene; 5-(3-cyclopentenyl)-2-norbornene and 5-cyclohexlidene-2-norbornene.

In general, the preparation of copolymers or terpolymers suitable for the practice of this invention by means of Ziegler-Natta catalysts is known in the prior art; for example, see U.S. Pat. Nos. 2,933,480; 3,000,866; and 3,093,621. These polymers, which are primarily produced for use in elastomeric compositions, are usually characterized by the substantial absence of chain or backbone unsaturation while the nonconjugated dienes define sites of unsaturation in groups which are pendant to or are in cyclic structures outside the main polymer chain. Ethylene-propylene-nonconjugated diolefin (EPDM) terpolymers are known articles in commerce. Various examples of such commercially available copolymers or terpolymers are VISTALON ®, an elastomeric copolymer of ethylene and propylene, or terpolymer of ethylene, propylene and 5-ethylidene-2-norbornene, marketed by Exxon Chemical Co., New York, N.Y. and NORDEL ®, a terpolymer of ethylene, propylene and 1,4-hexadiene, marketed by E. I. duPont de Nemours & Co., Wilmington, Del.

These commericial polymers, which are usually high molecular weight elastomers, may be further modified by mastication, extrusion, milling, heating, etc., in order to break down their molecular weight to different grades optimum for various oil or fuel additive uses.

A typical EPDM (terpolymer of ethylene, propylene and a diene monomer) is VISTALON 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The Mn of VISTALON 2504 is about 47,000, the Mv is about 145,000 and the Mw is about 174,000.

Another EPDM terpolymer VISTALON 2504-20 is derived from V-2504 (Exxon Chemical Co.) by a controlled extrusion process, wherein the resultant Mooney viscosity at 212° F. is about 20. The Mn of VISTALON 2504-20 is about 26,000, the Mv is about 90,000 and the Mw is about 125,000.

NORDEL 1320 (DuPont) is another terpolymer having a Mooney viscosity at 212° F. of about 25 and having about 53 wt. % of ethylene, about 3.5 wt. % of 1,4-hexadiene and about 43.5 wt. % of propylene.

The preferred EPDM terpolymers of this invention have a number average molecular weight (Mn) of about 5000 to 500,000, usually about 10,000 to about 200,000, more preferably of about 15,000 to about 100,000, most preferably of about 20,000 to about 60,000. The Mooney viscosity (ML, 1+8, 212° F.) of the EPDM terpolymer is about 1 to 60, e.g. 2 to about 50, more preferably about 3 to about 40, and most preferably about 5 to about 40. The Mv of the EPDM terpolymer is preferably below about 350,000 and more preferably below about 300,000. The Mw of the EPDM terpolymer is preferably below about 350,000.

The neutralized sulfonated elastomeric polymers of this present instant invention further include degraded or cracked ethylene-propylene copolymers or EPDM polymers, unsaturated elastomeric polymers such as butyl rubber, etc.

The expression "butyl rubber" as employed in the specification and claims is intended to include copolymers of 85 to 99.8 wt. % of an isoolefin which has about 4 to 7 carbon atoms, e.g. isobutylene and about 0.2 to 15 wt. % of a conjugated multiolefin having from about 4 to 14 carbon atoms, e.g. isoprene. More usually, the butyl rubber may have incorporated therein from about 0.2 to 10% of combined multiolefin; preferably about 0.5 to about 6%; more preferably about 1 to about 4%, e.g. 2%.

Illustrative of butyl rubber is Exxon Butyl 365 (Exxon Chemical Co.), having a mole percent unsaturation of about 2.0% and a Mooney viscosity (ML, 1+8, 212° F.) of about 40-50.

Sulfonation

One means for carrying out the polymer sulfonation is to first dissolve the polymer in a substantially nonreactive solvent including mineral lubricating oils such as white oil, or even lubricating oils containing some aromatics such as solvent neutral oils e.g. Solvent 100 Neutral, Solvent 150 Neutral, etc., chlorinated aliphatic hydrocarbon, chlorinated aromatic hydrocarbon, aliphatic hydrocarbons, etc. Some specific examples include carbon tetrachloride, dichloroethane, chlorobenzene, cyclohexane, pentane, isopentane, hexane, isohexane or heptane, etc. A sulfonating agent is added to the solution of the elastomeric polymer and nonreactive solvent at a temperature of about −30° C. to about 100° C., over a period of time ranging from as quickly as possible, e.g. a few seconds to about 60 minutes, more usually at about room temperature for about 1 to about 45 minutes, e.g. about 1 to about 30 minutes. Typical sulfonating agents are described in U.S. Pat. Nos. 3,642,728 and 3,836,511, incorporated herein by reference. These sulfonating agents are preferably selected from an acyl sulfate, a mixture of sulfuric acid and an acid anhydride or a complex of a sulfur trioxide donor and a Lewis base containing oxygen, sulfur, or phosphorus. Typical sulfur trioxide donors are $SO_3$, sulfuric acid, oleum, etc. Typical Lewis bases are: dioxane, tetrahydrofuran, triethylphosphate, etc. The most preferred sulfonation agent for the invention is an acyl sulfate selected from the group consisting essentially of benzoyl, acetyl, propionyl or butyryl sulfate.

The reaction can be quenched with an aliphatic alcohol such as methanol, ethanol, isopropanol, with an aromatic hydroxyl compound, such as phenol, a cycloaliphatic alcohol such as a cyclohexanol or with water. The acid form of the sulfonated polymer will generally have about 1 to about 60 meq. (milliequivalents) $SO_3H$ groups per 100 grams of sulfonated polymer, more preferably about 1 to about 50; and most preferably about 2 to about 31. The meq. of $SO_3H$/100 grams of polymer is determined by both titration of the polymeric sulfonic acid and Dietert Sulfur analysis. In the titration of the sulfonic acid the polymer can be dissolved in a solvent consisting of 95 parts of toluene and 5 parts of methanol at a concentration level of 50 grams per liter of solvent. The acid form can then be titrated with ethanolic sodium hydroxide to an Alizarin Thymolphthalein endpoint.

The resulting sulfonated polymer, preferably in solution, e.g. in the aforesaid solvent used to carry out the sulfonation such as mineral lubricating oil, can be readily reacted with said amines, ammonium salts, or $NH_3$ by mixing together at −30 to 100, preferably 0 to 60° C., for from 10 minutes to 30 hours, preferably 10 minutes to 10 hours, usually about 15 minutes to about 3 hours. For large scale use, it is particularly preferred to form a solution of the starting polymer in solvent (preferably a mineral lubricating oil), then sulfonate the polymer and then neutralize, to thereby form a concentrate of the final neutralized sulfonated polymer while avoiding the need to strip off the solvent.

The Nitrogen Neutralizing Agent

Useful amine compounds for neutralization of the sulfonated polymers include mono- and polyamines of about 2 to 60, e.g. 3 to 20, total carbon atoms and about 1 to 12, e.g., 2 to 7 nitrogen atoms in the molecule, which amines may be hydrocarbyl amines or may be hydrocarbyl amines including other groups, e.g., hydroxy groups, alkoxy groups, amide groups, imidazoline groups, and the like. Hydroxy amines with 1 to 6 hydroxy groups, preferably 1 to 3 hydroxy groups are particularly useful. Preferred amines are aliphatic saturated amines, including those of the general formulas:

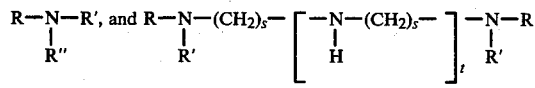

wherein R, R' and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; s is a number of from 2 to 6, preferably 2 to 4; and t is a number of from 0 to 10, preferably 2 to 6.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; etc.

Other useful amine compounds include: alicyclic diamines such as 1,4-di(aminomethyl) cyclohexane, and heterocyclic nitrogen compounds such as imidazolines, and N-aminoalkyl piperazines of the general formula:

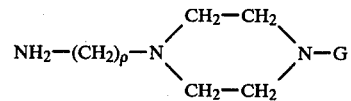

wherein G is independently selected from the group consisting of hydrogen and omega-aminoalkylene radicals of from 1 to 3 carbon atoms, and p is an integer of from 1 to 4. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds having a composition approximating tetraethylene pentamine are available commercially under the trade name "Polyamine H" and "Polyamine 400" (PA-400).

Ammonia may also be used as a neutralizing agent as well as ammonium salts, including inorganic salts, e.g., ammonium hydroxide, ammonium chloride, etc., as well as ammonium salts of aliphatic or aromatic carboxylic acid, e.g., $C_1$ to $C_{10}$ fatty acids, aromatic acids, such as ammonium acetate, ammonium oxalate, ammonium benzoate, etc.

While the above is primarily directed to sulfonating a hydrocarbon polymer and then at least partly neutralizing with a nitrogen compound which material is used in oil compositions equivalent materials may be formed, in some instances, by direct synthesis from hydrocarbon monomers and sulfonate or neutralized sulfonate monomers, to give equivalent compositions, which are contemplated as being within the scope of the present invention.

The Compositions

The reaction products of this invention can be incorporated in lubricating oil compositions, e.g., automotive crankcase lubricating oils, in concentrations within the range of about 0.01 to 10 weight percent, e.g. 0.1 to 7 weight percent, preferably 0.2 to 5.0 weight percent, based on the weight of the total composition. The lubricants to which the products of this invention can be added include not only hydrocarbon oils derived from petroleum but also include synthetic oils such as alkyl esters of dicarboxylic acids, polyglycols and alcohols; polyalphaolefins, alkyl benzene, organic esters of phosphoric acids, polysilicone oil, etc.

When the products of this invention are used, for example as dispersants, in normally liquid petroleum fuels such as gasoline, and middle distillates boiling from about 150° to 800° F., including kerosene, diesel fuels, home heating fuel oil, jet fuel, etc., a concentration of the additive in the fuel in the range of 0.001 to 0.5, preferably about 0.001 to 0.1 weight percent, based on the weight of the total composition, will usually be employed.

The additive may be conveniently dispensed as a concentrate comprising a minor proportion of the additive, e.g. 5 to 45 wt. % dissolved in a major proportion of a mineral lubricating oil, e.g., 95 to 55 wt. %, with or without other additives being present.

In the above compositions or concentrates, other conventional additives may also be present, including dyes, pour point depressants, antiwear agents such as tricresyl phosphate or zinc dialkyl dithiophosphates of 3 to 8 carbon atoms in each alkyl group, antioxidants such as N-phenyl α-naphthylamine, t-octyl phenol sulfide, 4,4'-methylene bis (2,6-di tertbutyl phenol), other viscosity index improvers such as ethylene-propylene copolymers, polymethacrylates, polyisobutylene, alkyl fumarate-vinyl acetate copolymers, and the like, as well as other ashless dispersants such as the polyisobutylene succinic anhydride reacted with amines, hydroxy amines, polyols, etc., metal detergents such as carbon dioxide overbased metal alkylaryl sulfonates, which also serve as antirust agents, etc.

Forming The Oil Compositions

The sulfonate products, in general, are difficult to dissolve in oil, and may require long dissolving periods, elevated temperature, vigorous agitation, etc. Preparing concentrates is usually even more difficult. It has been found that using an alcohol, e.g. $C_1$ to $C_{20}$ alkanols, preferably $C_4$ to $C_{13}$ alkanols, as a cosolvent will facilitate dissolving the neutralized sulfonated polymers into mineral oil. For example, adding the polymers to lubricating oil, along with 0.2 to 6 parts by weight, preferably 0.5 to 3 parts by weight of alcohol, per part by weight of the neutralized sulfonated polymer, will materially decrease the dissolving time. The addition of these amounts of the aforesaid alcohols is also useful in reducing the viscosity of the composition. This is particularly useful when making concentrates and additive packages as larger amounts of sulfonated product can be incorporated into the oil without making the concentrate unduly viscous so as to interfere with ease of handling or subsequent blending.

It was also found that oil soluble alkyl hydroxy aromatic sulfides, such as alkyl phenol sulfides, which are conventional lubricating oil antioxidants, will also facilitate oil solubilization of the nitrogen derivatized sulfonated polymer. These sulfides are generally formed by reacting alkylated phenolic or polyhydroxy aromatics having 1 to 3 OH groups, e.g., alkyl phenol or dihydroxy benzene (e.g., resorcinol), etc., with 1 to 3 alkyl groups of about 2 to 20, usually 8 to 12 carbons each, with sulfur or sulfur halides e.g., sulfur mono or dichlorides.

Other materials that can be used to facilitate dissolving the nitrogen containing sulfonates are lubricating oil ashless sludge dispersants, such as those formed by reacting long chain (usually $C_2$ to $C_5$ olefin polymer) substituted succinic anhydride or acid, e.g., polyisobutenyl succinic anhydride, wherein the polyolefin substituent group, e.g. polyisobutenyl group, in about 50 to 400 carbons, with amines or hydroxy amines, e.g. the aforesaid Nitrogen Neutralizing Agent, or with $C_1$ to $C_{40}$, e.g. $C_2$ to $C_{20}$ alcohols, including polyols with 2 to 10 hydroxy groups. Such dispersants are preferably made by reacting polyethylenepolyamines, e.g. tetraethylenepentamine; tris hydroxymethyl aminomethane (THAM); pentaerythritol; etc. with the polyisobutenyl succinic anhydride and are usually available in the form of concentrations of about 40 to 60 wt. % in mineral oil. Since the phenol sulfide antioxidant, and particularly ashless sludge dispersants may be used in forming the finished lubricant, by preblending these with the sulfonate they can be made to also facilitate the solvation of the sulfonate and to form additive concentrates or a finished lubricant. Thus, it may be advantageous to first blend into the oil the phenol sulfide and/or ashless dispersant, before blending in the sulfonate polymer.

A method of preparing these oil compositions, e.g. lubricating oil concentrates is by using 0.1 to 20, preferably 0.2 to 6, more preferably 0.5 to 3 parts by weight of the dissolving aid, i.e., alcohol, phenol sulfide, ashless dispersant, per part by weight nitrogen containing sulfonate in the oil, at temperature ranging from ambient (e.g. 25° C.) up to about 200° C. and preferably up to about 10° C. below the boiling point of the cosolvent. A smooth, homogeneous gel-like fluid or gel-like semisolid additive blend can be obtained which becomes fluid on heating. This concentrate, in turn, can be further dissolved with added lubricating or fuel oil to form finished formulations at ambient or slightly elevated temperatures.

This invention will be further understood by reference to the following examples, which include preferred embodiments of the invention.

EXAMPLE 1

Part A - Sulfonation

One hundred grams of NORDEL 1320 (a terpolymer having a Mooney viscosity at 212° F. of about 25 and having about 53 wt. % ethylene, about 43.5 wt. % propylene, and about 3.5 wt. % of 1,4-hexadiene) were dissolved in 1000 ml of hexane in a reactor. The reactor used in these Examples was a flask equipped with a stirring rod driven by an electric motor, a thermometer, a condensor, a dropping funnel, and a nitrogen inlet so as to maintain a nitrogen atmosphere during the preparation. The flask had a heating mantle, which was removable, e.g. when it was desired to cool the flask in an ice bath. To a mixture of 1.4 grams (0.015 moles) of para-dioxane and 50 ml of 1,2-dichloroethane were added 1.2 grams (0.015 moles) of $SO_3$ with a syringe under a hood. This mixture was then added to the reactor slowly and carefully with vigorous stirring over a period of about 45 minutes followed by stirring for an additional 30 minutes.

Part B—Neutralization

A mixture of 5.5 grams of tetraethylene pentamine (TEPA) dissolved in 75 ml of para-dioxane was rapidly added to the reactor and the mixture stirred vigorously for about two hours. One gram of American Cyanamid 2246 antioxidant was then added, followed by stirring for 5 minutes. Then the reactor was discharged and the contents were poured into a 4-liter beaker containing about 2 liters of isopropanol to precipitate the polymer, which was then broken up into crumbs and washed two times in isopropanol using an explosion proof Waring blender and filtered. The polymer product was then placed in a vacuum oven for 3 hours under vacuum while at room temperature (about 20° C.), following which the heat was turned on and the oven set at 72° C. and so maintained overnight.

96.1 grams of dried product were obtained the following morning which analyzed 85.6 wt. % carbon, 13.00 wt. % hydrogen, 0.70 wt. % nitrogen, and 0.43 wt. % sulfur. On a molar basis, this corresponds to 0.04998 moles of nitrogen and 0.01341 moles of sulfur, or a nitrogen-to-sulfur ratio of 3.723.

EXAMPLE 2

One hundred grams of NORDEL 1320 dissolved in 1000 ml of hexane in the reactor were first cooled in an ice bath to about 8° C. Then 1.2 grams of $SO_3$ dissolved in a mixture of 1.4 grams of dioxane and 50 ml of 1,2-dichloroethane were added at 8° C. over a period of about 40 minutes followed by stirring for one hour. 3.1 grams (0.025 mole) of trishydroxymethylaminomethane (THAM) were quickly added followed by stirring for one hour. The reactor was then removed from the ice bath followed by mixing for two more hours. Then 0.3 g of said antioxidant were added, followed by 5 minutes of stirring. Then the material was precipitated and washed in isopropyl alcohol as described above, and dried. 85.1 grams of dried polymer were obtained, analyzing 84.57 wt. % carbon, 14.24 wt. % hydrogen, 0.54 wt. % nitrogen and 0.26 wt. % sulfur.

EXAMPLE 3

This preparation was carried out in a manner similar to that described in Example 2 above except that 1.8 grams (0.03 mole) of ethylene diamine were utilized in place of the 3.1 grams of THAM of Example 2.

EXAMPLE 4

100 grams of NORDEL 1320 dissolved in 1000 ml of hexane in the reactor were cooled to −10° C., following which 71.7 grams of a solution made up by adding 4.44 grams of $SO_3$ (0.030 mole) to a mixture consisting of 123.36 grams of 1,2-dichloroethane and 4.90 grams of para-dioxane, were added to the reactor flask over a period of 30 minutes. The flask was removed from its cooling bath, followed by 30 minutes of additional mixing. The temperature had now risen to 10° C. and $NH_3$ gas was bubbled into the reaction flask for 15 minutes. A few cc's of isopropyl alcohol were added to the reaction mixture to reduce its viscosity to facilitate stirring. Stirring was continued for 15 minutes after which additional $NH_3$ was added for another 10 minutes. Stirring at ambient temperatures was continued for another 1.5 hours, after which $NH_3$ was added for about 25 minutes followed by another 1.5 hours of stirring. The material was isolated by precipitation with isopropyl alcohol, filtered and dried as previously described. 97.1 grams of material were obtained analyzing 83.92% carbon, 13.84 wt. % hydrogen, 0.33 wt. % nitrogen (0.02356 mole), 0.54 wt. % sulfur (0.01684 mole) and a chlorine content of 0.11 wt. % apparently due to contamination of the dichloroethane solvent.

EXAMPLE 5

250 grams of NORDEL 1320 were dissolved in 5000 ml of hexane. Acetyl sulfate was made in an ice bath at 0° C. while protected from moisture by adding 10.32 grams (0.055 moles) of 95 wt. % sulfuric acid to 16.54 grams (0.0894 mole) of acetic anhydride and mixing. Then 14.78 grams of the acetyl sulfate were dissolved in 50 ml of 1,2-dichloroethane. The solution of the acetyl sulfate in the dichloroethane was added dropwise very slowly to a vigorously stirred solution of the polymer in hexane over a period of about one hour, after which the reaction mixture was stirred for an additional 75 minutes following which 230 ml of isopropyl alcohol was added to the reaction flask in order to deactivate the reaction mixture. The resulting mixture was then divided into four portions of 960 grams each in 2 liter flasks and the portions were separately neutralized as follows:

(A) This portion was neutralized by blowing $NH_3$ gas through the reaction mixture while stirring. More specifically, $NH_3$ was added with moderate bubbling for about 10 minutes followed by shutting off the ammonia and stirring vigorously for one hour, then adding 0.5 grams of the 2246 antioxidant which were stirred in for 10 minutes, followed by adding 60 ml of isopropyl alcohol and then discharging from the reactor. After washing and drying, 57.03 grams were obtained of dried product which analyzed 84.8 wt. % carbon, 14.28 wt. % hydrogen, less than 0.30 wt. % nitrogen and 0.42 wt. % sulfur.

(B) A solution of 22.13 grams (0.1169 mole) of tetraethylene pentamine dissolved in 25 ml of para-dioxane was added to the sulfonated polymer solvent solution with vigorous stirring over a period of about one hour, after which 0.5 gram of the 2246 were added and stirred for 10 minutes. Then 60 ml of isopropyl alcohol were added and the reactor contents discharged, washed, filtered and dried. 60.57 grams of product were obtained. The dried product analyzed 83.89 wt. % carbon, 14.19 wt. % hydrogen, less than 0.30% nitrogen, and 0.37% sulfur.

(C) 11.83 grams (0.1169 moles) of triethylamine dissolved in 20 ml of para-dioxane were added slowly to the sulfonated polymer solvent solution with vigorous stirring over about one hour. Following this, 0.5 grams of 2246 antioxidant were added, followed by stirring for 10 minutes and then the addition of 60 ml isopropyl alcohol. The product was discharged from the reactor, washed, filtered and dried in the usual manner. 58.19 grams of product were obtained having about 86.22 wt. % carbon, 14.44 wt. % hydrogen, and less than 0.30 wt. % nitrogen.

(D) 17.44 grams (0.1169 mole) of triethanolamine, i.e., 2,2', 2''-nitrilotriethanol, $N(CH_2—CH_2—OH)_3$, dissolved in 35 ml of para-dioxane were added to the sulfonated polymer solution over about one hour with vigorous stirring, followed by the addition of 0.5 grams of American Cyanamid 2246 and then finishing as described in (A). 61.72 grams of product were obtained. The dried product analyzed 83.46 wt. % carbon, 13.51 wt. % hydrogen, 0.35 wt. % nitrogen, and 0.40 wt. % sulfur.

EXAMPLE 6

250 grams of the previously described Vistalon 2504-20 was dissolved in 5000 grams of hexane. The 2504-20 terpolymer analyzed about 50.15 wt. % ethylene, about 44.08 wt. % propylene and about 5.77 wt. % of 5-ethylidene-2-norbornene. An acetyl sulfate was made in an ice bath by mixing 10.32 grams of 95 wt. % sulfuric acid with 16.54 grams of acetic anhydride. The polymer solution was sulfonated with 17.78 grams (0.022 moles) of this acetyl sulfate as described in Example 5 above. The sulfonated polymer solution was divided into four portions which were then treated with $NH_3$, tetraethylenepentamine, triethylamine and the 2,2′,2″-nitrilotriethanol in the same manner as in A, B, C, and D of Example 5 above. The characteristics of these neutralized materials are summarized below.

A. The ammonia neutralized polymer gave a yield of 58.21. The dried product analyzed 84.90 wt. % carbon, 13.90 wt. % hydrogen, 0.24 wt. % nitrogen and 0.57 wt. % sulfur.

B. The tetraethylenepentamine neutralized polymer gave a yield of 59.93 g. The dried product analyzed 83.34 wt. % carbon, 13.60 wt. % hydrogen, 1.60 wt. % nitrogen and 0.57 wt. % sulfur.

C. The triethylamine neutralized polymer gave a yield of 51.01 g. The dried product analyzed 83.97 wt. % carbon, 13.73% hydrogen, 1.93 wt. % nitrogen and 0.51 wt. % sulfur.

D. The nitrilotriethanol (triethanolamine) neutralized polymer gave a yield of 58.99 g. The dried polymer analyzed 83.29 wt. % carbon, 13.60 wt. % hydrogen, 0.31 wt. % nitrogen and 0.59 wt. % sulfur.

Sludge Inhibition Bench (SIB) Test

The efficacy of the derivatized copolymers of this invention as dispersants in lubricating oil is illustrated in a Sludge Inhibition Bench (SIB) Test. The SIB Test has been found, after a large number of evaluations, to be an excellent test for assessing the dispersing power of lubricating oil dispersant additives.

The medium chosen for the SIB Test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate anti-wear additive. The oil contained no sludge dispersant. A quantity of such used oil was acquired by draining and refilling the taxicab crankcase at 1000-2000 mile intervals.

The Sludge Inhibition Bench Test is conducted in the following manner: The aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, on an active ingredient basis, of the particular additive being tested. Ten grams of each blend being tested are placed in a stainless steel centrifuge tube and are heated at 138° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighting it. The results are reported as percent of sludge dispersed by comparison with a blank not containing any additional additive. The less new sludge precipitated in the presence of the additive, the larger the value of percent sludge that is dispersed, and the more effective is the additive as a sludge dispersant. In other words, if the additive is effective, it will hold at least a portion of the new sludge that forms on heating and oxidation stably suspended in the oil so it does not precipitate down during the centrifuging. Using the above test, the sludge dispersant activities of the preceding nitrogen containing sulfonate materials are shown in the following Table at a 2 wt. % active ingredient level in the oil.

TABLE I

SLUDGE INHIBITION BENCH TEST

| 2 wt. % of Additive of Example | Neutralizing Ammonia or Amine | SIB Test % Sludge Suspended |
|---|---|---|
| Blank | — | 0 |
| 1 | TEPA | 96 |
| 2 | THAM | 66 |
| 3 | EDA | 64 |
| 4 | $NH_3$ | 44 |
| 5A | $NH_3$ | 63 |
| 5B | TEPA | 83 |
| 5C | $Et_3N$ | 32 |
| 5D | $N(CH_2-CH_2-OH)_3$ | 28 |
| 6A | $NH_3$ | 43 |
| 6B | TEPA | 56 |
| 6C | $Et_3N$ | 86 |
| 6D | $N(CH_2-CH_2-OH)_3$ | 52 |

As seen by the above Table I, all the various neutralized sulfonated polymers of the Examples were effective as sludge dispersants.

EXAMPLE 7

An acetyl sulfate solution was prepared at about 0° C. adding 20.26 grams of 95% sulfuric acid to a mixture of 33.24 grams of acetic anhydride and 198.93 grams of 1,2-dichloroethane to give a total of 252.43 grams of acetyl sulfate solution. 21.38 grams of this acetyl sulfate solution were added to the reactor containing a solution of 100 grams of NORDEL 1320 and 1000 ml of hexane at a temperature of about 14° C., dropwise while stirring over about four minutes. About 1.5 hours later the temperature had risen to about 34° C. when an ice bath was placed under the reactor to reduce the temperature to ambient, about 24° C. The material was held at ambient temperatures overnight. Then 15 ml of isopropyl alcohol were mixed in and the dropwise addition of 9.15 grams of $NH_3$ in 30.57 grams of cold isopropyl alcohol (super-saturated) was begun. The ammonia-isopropanol addition was completed in about 4 minutes and after about 1.5 hours, $NH_3$ gas was bubbled into the reaction mixture to maintain an ammonia blanket overnight. The neutralized polymer material was recovered, washed and dried and 93 grams of product was obtained the next day.

EXAMPLE 8

500 grams of NORDEL 1320 were dissolved in 5500 ml hexane. 96.97 grams of a dichloroethane solution containing about 0.080 moles of acetyl sulfate were added with stirring over a period of about 1.5 hours. The acetyl sulfate had been prepared in a larger batch at about 0° C. or lower, by adding 30.66 grams of 97 wt. % $H_2SO_4$ to a mixture of 49.06 grams of acetic anhydride and 299.99 grams 1,2-dichloroethane to give a total of 379.71 grams. The reaction mixture was held overnight and then 75 ml of isopropyl alcohol were added, stirred for about 20 minutes and then 50 ml of $NH_3$ dissolved in 68.48 grams of cold isopropyl alcohol were added over about 17 minutes. About 1.5 hours later the mixture was warmed from a temperature of about 27° C. to about 59° C. The following day the material was warmed to 49° C., precipitated, washed, filtered and dried in the usual manner. 454 g. of product was obtained.

EXAMPLE 9

An EPDM was sulfonated with acetyl sulfate to the 0.015 sulfonation level in a manner similar to that described above with regard to Example 7, and was neutralized with aniline, precipitated, filtered, washed and dried in the usual manner to give a product which analyzed about 0.101 wt. % nitrogen and about 0.50 wt. % sulfur.

The EPDM consisted of about 56.2 wt. % ethylene, about 40.6 wt. % propylene and about 3.2 wt. % of 5-ethylene-2-norbornene and had a Mooney viscosity (ML 100° 1 C.) of 19.5 and a degree of unsaturation of about 47.5 meq./100 g. (in contrast to the aforesaid Nordel 1320 which had an unsaturation of about 39.5 meq./100 g.).

Varnish Inhibition Bench Test (VIB)

Each test sample consisted of 10 grams of lubricating oil and either 1 or 2 wt. % of the neutralized polymer. The test oil to which the additive is admixed was a commercial lubricating oil obtained from a taxi after about 2,000 miles of driving with said lubricating oil. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent $SO_2$, 1.4 volume percent NO and balance air, was bubbled through the test samples. During the cooling phase water vapor was bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls was rated 1 to 11 with the higher number being the greater amount of varnish.

The neutralized sulfonated polymers of Examples 4, 7, 8 and 9, were tested in SIB and VIB tests, along with a blank with no dispersant, and a commercial VI dispersant which is a copolymer of styrene and maleic anhydride neutralized with amine and alcohol as described in U.S. Pat. No. 3,702,300. The materials tested and the test results are summarized in the following Table II.

TABLE II

| | Test Results | | | |
|---|---|---|---|---|
| | 2.0 wt. % a.i. | | 1.0 wt. % a.i. | |
| Example | SIB | VIB | SIB | VIB |
| Blank | 10 | 11 | 10 | 11 |
| Commercial V.I. dispersant | 7.6 | 3 | 9.2 | 8 |
| 4 | 4.5 | 1 | 5.8 | 8 |
| 7 | 2.4 | 1 | 2.7 | 2 |
| 8 | — | — | 3.0 | 1 |
| 9 | — | — | 4.7 | 5 |

As seen by Table II, the materials of Examples 4, 7, 8 and 9 gave good results (low values) in the SIB and VIB test and were better than the commercial multifunctional VI-dispersant additive. Here the SIB ratings were on a basis of the amount of sludge that precipitated during centrifuging relative to the blank rating of 10. To illustrate, Example 7 at 2.0% a.i. allowed the precipitation of only 24% of the sludge that precipitated with no additive (i.e. the Blank). As a result, low numbers indicate increased effectiveness in the above SIB and VIB tests.

EXAMPLE 10

500 grams of NORDEL 1320 dissolved in 5500 ml of hexane was sulfonated by the addition of 96.79 grams of acetyl sulfate complex by adding the complex to the stirred polymer-hexane mixture over a period of about 1½ hours. Stirring was continued for about another six hours at which time the stirrer was turned off and the material was held overnight under a nitrogen blanket. The following morning 75 ml of isopropyl alcohol was added. A solution of 68.48 grams of cold isopropyl alcohol and 50 ml of liquid $NH_3$ was added to the reactor over about 17 minutes. After about 1½ hours of mixing, the heat was turned on and over a period of about 4½ hours the temperature slowly rose to 59° C. wherein the heat was turned off and a viscous material formed. The following day the material was precipitated, washed and dried in a manner similar to that previously described above. In a similar manner, two additional batches were made which were then combined to give a composite material which was then used for testing.

Formulation A

A fully formulated motor oil composition was prepared containing about 87.9 vol. % of a Solvent 150 Neutral mineral lubricating oil; 7.4 vol. % of an oil concentrate containing 10 wt. % of an ethylene-propylene copolymer viscosity index (V.I.) improver and 4 wt. % of a fumarate-vinyl acetate copolymer as a pour point depressant; 1.0 vol. % of nonyl phenol sulfide as antioxidant; 1.4 vol. % of a zinc dialkyl dithiophosphate concentrate (75 wt. % active ingredient (a.i.) in diluent mineral oil) formed by reacting $P_2S_5$ with a mixture of about 65 wt. % isobutyl alcohol and about 35 wt. % amyl alcohol and then neutralizing with zinc oxide; 1.5 vol. % of a 50 wt. % active ingredient concentrate of an ashless dispersant mixture of a polyisobutenyl succinic anhydride reacted with polyethyleneamine and then borated, together with a polyisobutenyl succinic anhydride reacted with trihydroxylmethylamino methane, as described in U.S. Pat. No. 4,113,639, and 0.8 vol. % or a 400 TBN (Total Base Number) $CO_2$ overbased magnesium alkylaryl sulfonate containing 9.2 wt. % magnesium as anti-rust; all of said volume percents being based on the volume of the total composition.

Formulation B

This formulation was prepared with the same composition as Formulation A except that 0.7 wt. % of the sulfonated polymer of Example 10 was used in place of the 0.7 wt. % of ethylene-propylene copolymer. An additive blending sequence was devised to facilitate the dissolution of the sulfo-animated EPDM V.I. improver and which inhibits partial gelation or other additive incompatibility problems. More specifically, the procedure, starting with mixing the base oil and the pour depresssant, was to next add the nonyl phenol sulfide, then the zinc dialkyl dithiophosphate, then the sulfonated polymer of Example 10 while warming to a temperature of about 100°–110° C. and when this sulfonated polymer had completely dissolved, then the dispersant and the overbased magnesium sulfonate were added.

Formulation B'

To demonstrate the effect of an alcohol in reducing the viscosity of oil solutions of the sulfonated polymer, 1.4 parts by weight of hexanol were added to 100 parts by weight of Formulation B.

The viscosity characteristics of the Solvent 150 Neutral base oil per se, and formulations A, B, and B' are summarized in Table III which follows.

TABLE III

VISCOSITY IMPROVEMENT OF FULLY FORMULATED OIL

| Oil | CCS* cP at 0° F. | Kv cS at 210° F. | SAE Grade |
|---|---|---|---|
| S-150-N per se | 1250 | 5.35 | 10 W |
| Formulation A | 1990 | 11.38 | 10 W-30 |
| Formulation B | 1900 | 23.29 | 10 W-50+ |
| Formulation B' | 1730 | 15.09 | 10 W-40 |

*Viscosity measured under the high shear Cold Cranking Simulator (ASTM D2602 method).

As seen by the above, the material of Example 10 (Formulation B) gave a lower viscosity of 1900 centipoise at 0° F. than the ethylene-propylene V.I. improver (Formulation A). Formulation B also gave a much higher viscosity of 23.29 centistoke at 210° F. than Formulation A. Thus, a greater VI effect was achieved with the sulfonated polymer (Formulation B) than the ethylene-propylene polymer (Formulation A).

Formulation B was tested in a conventional CRC L-38 engine test for oxidation (corresponding to Federal Test Method 3405.2 of Mar. 8, 1972). The test is carried out in a single cylinder engine operating for 40 hours under steady state conditions. At the completion of the test the engine is inspected for evidence of sludge and varnish, and the bearings are weighed for an indication of corrosion. The results are summarized in Table IV which follows.

TABLE IV

| Inspection | Formulation B | Target or Perfect |
|---|---|---|
| BWL, mgs. | 11.1 | 40 max. |
| PSV | 9.7 | 10 |
| Varnish, total | 59.2 | 60 |
| Sludge, total | 59.5 | 60 |

As seen by Table IV, Formulation B with the sulfonated polymer gave a copper-lead bearing weight loss of 11.1 mg. against an allowable maximum of 40 mg. The piston skirt varnish was rated 9.7 while 10 is perfectly clean. The total varnish and sludge were nearly at the perfect rating of 60.

The viscosity of the test oil during the CRC L-38 test was measured at 210° F. at the beginning and during the test. The percentage decrease in viscosity was determined as summarized in Table V.

TABLE V

CRC L-38 TEST INSPECTIONS OF FORMULATION B

| Temperature °F. | Viscosity SUS/Test Hrs. | | | | | |
|---|---|---|---|---|---|---|
| | New | 10 Stripped | 10 | 20 | 30 | 40 |
| 210 | 78.60 | 66.30 | 64.55 | 61.60 | 60.25 | 59.60 |
| % Decrease | | 15.6 | 17.9 | 21.6 | 23.3 | 24.2 |
| SAE Grade | 40 | 30 | | | | 30 |

As seen by Table V, the fresh oil had a viscosity of 78.60 SUS, corresponding to a SAE 40 grade oil. After 10 hours, a sample of the oil was stripped of any volatiles and gave a viscosity of 66.3 SUS while the corresponding unstripped oil gave a viscosity of 64.55 SUS. After 40 hours, the viscosity had dropped to 59.60 SUS, but still qualified as a SAE 30 grade oil.

FORMULATION C

This formulation was similar to that of Formulation B except that no pour depressant or hexanol was used. Also, in place of the 0.70 wt. % of sulfonated polymer, there was used, 1.8 wt. % (active ingredient basis) of the aforesaid commercial V.I. dispersant of Table II (copolymer of maleic anhydride and styrene neutralized with amine and alcohol) and correspondingly less base oil.

Formulations B and C were tested in the Sequence V-C engine test, which is described in "Multicylinder Test Sequences for Evaluating Automotive Engine Oils," ASTM Special Technical Publication 315F, page 133ff (1973). The V-C test evaluates the ability of an oil to keep sludge in suspension and prevent the deposition of varnish deposits on pistons, and other engine parts. The results are summarized in Table VI.

TABLE VI

SEQUENCE V-C ENGINE TEST

| Inspection | Formulation B | C | Target |
|---|---|---|---|
| Sludge | 8.50 | 9.24 | 8.50 |
| PSV | 7.98 | 7.95 | 7.90 |
| Varnish | 8.07 | 8.17 | 8.00 |

As seen by Table VI, Formulation B containing the 0.7% sulfonated polymer met the target values of the test with regard to sludge, piston skirt varnish (PSV) and varnish. These ratings are based on a rating scale of 0 to 10, with 0 being the worst rating and 10 being perfect. Formulation B compared well with Formulation C containing 1.8 wt. % active ingredient of the commercial V.I.-dispersant although the active ingredient level in Formulation B of the V.I.-dispersant sulfonated polymer was only 0.7 wt. %.

EXAMPLE 11

Samples of EPDM terpolymer containing about 43 wt. % ethylene, about 3 wt. % of 5-ethylidene-2-norbornene with the balance propylene, having a Mooney viscosity (ML, 1+8, 212° F.) of 7 were sulfonated to levels of 10, 16 and 20 milliequivalents (meq.) sulfonic acid and neutralized with ammonia or N-aminopropyl morpholine (NAPM).

Fully formulated crankcase lubricating motor oil compositions were prepared containing 1.1 wt. % of the neutralized sulfonated polymer; about 88.64 wt. % of Solvent 150 neutral mineral lubricating oil; 3.31 wt. % of a Solvent 330 neutral mineral lubricating oil; 1.69 wt. % of nonylphenol sulfide (about 85 wt. % active ingredient in 15 wt. % mineral oil) as antioxidant; 0.20 wt. % of 45 wt. % concentrate of dialkyl fumarate—vinyl acetate copolymer pour point depressant; 1.83 wt. % of a zinc dialkyl dithiophosphate concentrate containing about 75 weight percent active ingredient in diluent mineral oil formed by reacting $P_2S_5$ with a mixture of about 65 wt. % isobutyl alcohol and about 35 wt. % of amyl alcohol and then neutralizing with zinc oxide; 2.16 wt. % of a 50 wt. % active ingredient concentrate of an ashless dispersant mixture of a polyisobutenyl succinic anhydride reacted with polyethyleneamine and then borated, together with a polyisobutenyl succinic anhydride reacted with tris-hydroxymethyl aminomethane, as described in U.S. Pat. No. 4,113,639; and 1.07 wt. % of a 400 TBN (Total Base Number) $CO_2$ overbased magnesium alkylaryl sulfonate containing about 9.2 weight percent magnesium, as an antirust material. The above formulations containing the sulfonated EPDM were compared with the formulation containing 1.1 weight percent of the unsulfonated EPDM terpolymer, and an identical formulation but containing instead one weight percent of a commercial ethylenepropylene copolymer viscosity index improver (EP-VI) with 88.74 wt. % of the Solvent 150 neutral oil. The specific compositions were then tested for their viscometric properties, namely kinematic viscosity at 210° C. in Centistokes, and under the high shear Cold Cranking Simulator (CCS) according to ASTM-D-2607-72 method at 0° C. for viscosity in centipoises, at −22° F. using a MiniRotary Viscosimeter, as well as being tested for ASTM pour point and ASTM sonic shear breakdown. The results obtained are summarized in the following Table.

TABLE VII

EFFECT OF SULFONATION LEVEL ON VISCOMETRICS (FORMULATED OIL)

|  | EPDM Polymer | | | | EP-VI Polymer |
|---|---|---|---|---|---|
| Sulfonation Level, meq. | 0 | 10 | 16 | 20 | 0 |
| Counterion | — | $NH_4+$ | $NH_4+$ | NAPM | — |
| Kv @ 210° F., cS | 11.70 | 14.10 | 15.77 | 14.5 | 15.87 |
| CCS @ 0° F., cP | 2500 | 2390 | 2400 | 2390 | 2840 |
| MRV @ −22° F., cP | 46,800 | 46,800 | 47,800 | — | 64,000 |
| POUR POINT, °F. | −35 | −30 | −30 | −30 | −30 |
| % SONIC SHEAR BREAKDOWN | 16.2 | 18.8 | 25.9 | .23 | 28 |
| WT. % POLYMER IN FORMULATION | 1.1 | 1.1 | 1.1 | 1.1 | 1.0 |

As seen by Table VII, sulfonation and neutralization has little effect upon the 0° F. viscosity of the polymer or upon its −22° F. viscosity, but has a large effect on increasing viscosity at 210° F. It is very desirable to have this low temperature viscometric advantage since the low temperature low viscosity facilitates cold cranking and start up of the engine in cold weather, while the higher 210° F. viscosity is desired in order to facilitate lubrication and minimize oil use during engine operation, and the greater this effect, the wider the cross grading of oils that can be obtained, e.g. 10W-50 or even wider (see Table III). It is seen that the sulfonated polymer was superior to the commercial ethylene propylene V.I. improver in that it had better low temperature viscosity when formulated to the same 210° F. viscosity level. This, the 16 meq. sulfonated and ammonia neutralized polymer gave a viscosity of 2400 cP at 0° C. in the Cold Cranking Simulator as compared to the higher viscosity of 2840 cP for the EP-VI, even though the 210° F. viscosities for both formulations were nearly identical. The pour point of the sulfonated polymer formulations were also good. Sulfonated polymers, e.g. EPDM, with about 25 to about 55 wt. % ethylene are particularly preferred for use in oils requiring pour depressant, since higher ethylene contents above about 55 wt. % ethylene tend to cause the ethylene copolymer, e.g. EPDM, to adversely interact with many conventional pour point depressants and/or the wax, e.g. see U.S. Pat. No. 3,691,078.

What is claimed is:

1. A composition comprising a major amount of a lubricating or fuel oil and a hydrocarbon soluble V.I. improver—dispersant ionic polymer having a number average molecular weight in the range of 5,000 to 1,000,000 formed by sulfonating an aliphatic $C_2$ to $C_{50}$ olefin polymer with a non-chlorine-containing sulfonating agent to a level of about 1 to 60 milliequivalents of $SO_3H$ groups per 100 grams of sulfonated polymer, said sulfonated polymer being at least partly neutralized with a neutralizing agent selected from the group consisting of ammonia, ammonia salts and amines; wherein when said composition comprises a major amount of said lubricating oil, said composition contains about 0.01 to 10 wt. % of said ionic polymer; and wherein when said composition comprises a major amount of said fuel, said composition contains 0.001 to 0.5 wt. % of said ionic polymer.

2. A composition according to claim 1 wherein said olefin polymer comprises a major weight proportion of $C_2$ to $C_{18}$ aliphatic olefin.

3. A composition according to claim 1, wherein said olefin polymer comprises about 30 to 84.5 mole % ethylene, about 15 to 69.5 mole % $C_3$ to $C_{18}$ alpha olefin and about 0.5 to 20 mole % of $C_5$ to $C_{14}$ diolefin, and has a number average molecular weight in the range of about 10,000 to 200,000 and is sulfonated to contain a sulfur content of about 0.03 to about 1.44 wt. % sulfur, wherein at least 25 mole % of the sulfonic acid units are neutralized to form said ionic polymer containing about 0.005 to 2.5 wt. % nitrogen.

4. A composition according to claim 3, wherein said sulfonated polymer is 50 to 100% neutralized with an amine of 2 to 60 total carbon atoms and 1 to 12 nitrogen atoms.

5. A composition according to claim 3, wherein said sulfonated polymer is 50 to 100% neutralized with ammonia or ammonium salt.

6. A composition according to claim 1, wherein said composition comprises a major amount of mineral lubricating oil and about 0.01 to 10 wt. % of said ionic polymer having a number average molecular weight of 10,000 to 200,000.

7. A composition according to claim 1, wherein said ionic polymer is formed from an elastomeric polymer selected from the group consisting of ethylene-propylene-diene terpolymers, and butyl rubber.

8. A composition according to claim 3, wherein said ionic polymer is a sulfonated ethylene-propylene-diene terpolymer.

9. A composition according to claim 8, wherein said sulfonated polymer is neutralized with a poly(ethyleneamine).

10. A composition according to claim 8, wherein said sulfonated polymer is neutralized with a hydroxy amine.

11. A composition according to claim 10, wherein said hydroxyamine is trishydroxymethylaminomethane.

12. A composition according to claim 8, wherein said amine is triethylamine.

13. A composition according to claim 10 wherein said hydroxy amine is 2,2',2" nitrilotriethanol.

14. A composition according to claim 7, wherein said ionic polymer is a sulfonated butyl rubber.

15. A composition according to claim 14 wherein said sulfonated polymer is neutralized with a poly(ethyleneamine).

16. A composition according to claim 14, wherein said sulfonated polymer is neutralized with a hydroxy amine.

17. A composition according to claim 14, wherein said hydroxy amine is trishydroxymethylaminomethane.

18. A composition according to claim 14, wherein said amine is triethylamine.

19. A composition according to claim 14, wherein said hydroxy amine is 2,2',2" nitrilotriethanol.

20. A process for improving the viscosity and dispersant properties of a lubricating oil composition which comprises adding a V.I. improver - dispersant oil soluble ionic polymer, having a number average molecular weight in the range of about 5000 to 1,000,000 to said lubricating oil composition at a concentration level of about 0.01 to about 10 weight percent, based on the weight of the total composition, said ionic polymer being formed by sulfonating a $C_2$ to $C_{50}$ aliphatic olefin polymer with a non-chlorine-containing sulfonating agent to a level of about 1 to 60 milliequivalents of $SO_3H$ groups per 100 grams of sulfonated polymer, and reacting with a neutralizing agent selected from the group consisting of ammonia, ammonium salts and amine.

21. A process according to claim 20, wherein said ionic polymer contains about 0.5 to 5.0 mole % ionic groups.

22. A process according to claim 20, wherein said polymer comprises about 30 to 84.5 mole % ethylene, about 15 to 69.5 mole % $C_3$ to $C_{18}$ alpha olefin and about 0.5 to 20 mole % of $C_5$ to $C_{14}$ diolefin, and has a number average molecular weight in the range of about 10,000 to 500,000, wherein at least 50 mole % of the sulfonic acid units are neutralized to form said ionic polymer containing 0.005 to 2.5 wt. % nitrogen.

23. A process according to claim 22, wherein said sulfonated polymer is a sulfonated terpolymer of ethylene and propylene with either 1,4 hexadiene or 5-ethylidene-2-norbornene, which is 50 to 100% neutralized with an amine of 2 to 60 total carbon atoms and 1 to 12 nitrogen atoms.

24. A process according to claim 22, wherein said sulfonated polymer is a sulfonated terpolymer of ethylene and propylene with either 1,4 hexadiene or 5-ethylidene-2-norbornene, which is 50 to 100% neutralized with ammonia or ammonium salt.

25. A process for preparing a V.I. improving - dispersant oil soluble ionic sulfonated polymer useful for a lubricating or fuel oil additive which comprises dissolving an aliphatic $C_2$ to $C_{50}$ olefin polymer having a number average molecular weight in the range of about 5,000 to 1,000,000 in a mineral lubricating oil as solvent to form an oil solution, sulfonating said polymer with a non-chlorine-containing sulfonating agent in said oil solution to introduce sulfonic acid groups, and then neutralizing said sulfonated polymer in said oil solution with a neutralizing agent selected from the group consisting of ammonia, ammonium salts and amines to form said oil additive.

26. An additive concentrate comprising diluent oil, in the range of about 5 to 45 wt. % of a hydrocarbon soluble V.I. improving - dispersant ionic polymer having a number average molecular weight in the range of 5000 to 1,000,000 formed by sulfonating an aliphatic $C_2$ to $C_{50}$ olefin polymer with a non-chlorine-containing sulfonating agent to a level of about 1 to 60 milliequivalents of $SO_3H$ groups per 100 grams of sulfonated polymer, said sulfonated polymer being neutralized at least partly with a neutralizng agent selected from the group consisting of ammonia, ammonium salts, and amine; and a solubilizing aid for said sulfonated polymer selected from the group consisting of lubricating oil ashless dispersants and oil soluble alkyl hydroxy aromatic sulfides lubricating oil antioxidants.

27. A concentrate according to claim 26, which also contains alcohol as a solubilizing agent for said polymer.

28. A concentrate according to claim 27, wherein said alcohol is hexanol.

29. A crankcase motor oil composition comprising a major amount of mineral lubricating oil, an antioxidant, a zinc dihydrocarbonyl dithiophosphate anti-wear additive, an alkaline earth metal overbased alkylaryl sulfonate, a pour point depressant, and an ashless dispersant, containing as a V.I.-dispersant, an oil soluble V.I. improving-dispersant ionic polymer having a number average molecular weight in the range of about 20,000 to 200,000 formed by sulfonating an aliphatic $C_2$ to $C_{50}$ olefin polymer with a non-chlorine-containing sulfonating agent, said sulfonated polymer having about 1 to 60 milliequivalents of $SO_3H$ per 100 grams of sulfonated polymer, and then neutralizing at least partly with a neutralizing agent selected from the group consisting of ammonia, ammonium salts and amines.

30. A composition according to claim 29, wherein said olefin polymer is a terpolymer consisting essentially of ethylene, propylene and a diene selected from the group consisting of 1,4 hexadiene and 5-ethylidene-2-norbornene, neutralized with ammonia.

31. A composition according to claim 1, wherein said composition is a lubricating oil composition.

32. A composition according to claim 1, wherein said composition is a fuel oil composition.

33. A method of operating an internal combustion automotive engine which comprises lubricating said engine with the composition of claim 31.

34. Oil soluble ionic polymer useful as a V.I. improving-dispersant additive for lubricating oil having a number average molecular weight in the range of about 5,000 to 1,000,000 formed by sulfonating an aliphatic $C_2$ to $C_{50}$ olefin polymer with a non-chlorine-containing sulfonating agent, said sulfonated polymer having about 1 to 60 milliequivalents of $SO_3H$ groups per 100 grams of sulfonated polymer, and being at least partly neutralized with a neutralizing agent selected from the group consisting of polyamines of 2 to 12 nitrogen atoms and 2 to 60 carbon atoms and hydroxy amines of 1 to 6 hydroxy groups.

35. Ionic polymer according to claim 34, wherein said olefin polymer has a number average molecular weight in the range of about 10,000 to 500,000 and said neutralizing agent is a polyamine selected from the group consisting of polyamines of the structure:

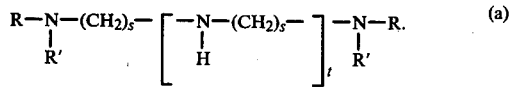

wherein R, and R' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; s is a number of from 2 to 6, and t is a number of (b). alicyclic diamines, (c). N-aminoalkyl piperazines of the general formula:

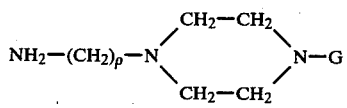

wherein G is independently selected from the group consisting of hydrogen and omega-aminoalkylene radicals of from 1 to 3 carbon atoms, and p is an integer of from 1 to 4, and (d). N-(aminopropyl)morpholine.

36. Ionic polymer according to claim 35, wherein said olefin polymer comprises about 40 to 70 mole % ethylene, about 20 to 58 mole % of propylene and 2 to 10 mole % of diolefin, and has a number average molecular weight in the range of about 10,000 to 200,000 and is sulfonated to contain a sulfur content of about 0.03 to about 1.44 wt. % sulfur, wherein at least 25 mole % of the sulfonic acid units are neutralized to form an ionic polymer containing about 0.005 to 2.5 wt. % nitrogen.

37. Polymer according to claim 36, wherein said sulfonated polymer is 50 to 100% neutralized with a polyamine of 2 to 60 total carbon atoms and 2 to 12 nitrogen atoms.

38. Polymer according to claim 36, wherein said sulfonated polymer is 50 to 100% neutralized with hydroxy amine.

39. Polyer according to claim 34, wherein said ionic polymer is formed from an elastomeric polymer selected from the group consisting of ethylene-propylene-diene terpolymers, and butyl rubber.

40. Polymer according to claim 39, wherein said ionic polymer is a sulfonated ethylene-propylene-diene terpolymer having a number average molecular weight in the range of about 15,000 to 100,000, having about 2 to 31 milliequivalents of sulfonate groups per 100 grams of polymer.

41. Polymer according to claim 40, wherein said sulfonated polymer is neutralized with a polyamine.

42. Polymer according to claim 41, wherein said polyamine is N-(aminopropyl)morpholine.

43. Polymer according to claim 41, wherein said polyamine is a polyethyleneamine.

44. Polymer according to claim 43, wherein said polyethyleneamine is tetraethylenepentamine.

45. Polymer according to claim 40, wherein said sulfonated polymer is neutralized with a hydroxy amine.

46. Polymer according to claim 45, wherein said hydroxyamine is trishydroxymethylaminomethane.

47. Polymer according to claim 45, wherein said hydroxy amine is 2,2',2" nitrilotriethanol.

* * * * *